United States Patent [19]

Hayashi et al.

[11] Patent Number: 5,232,411
[45] Date of Patent: Aug. 3, 1993

[54] STRUCTURE FOR AUTOMATIC TRANSMISSION

[75] Inventors: Yuji Hayashi; Koichi Hayasaki; Hirofumi Michioka, all of Kanagawa, Japan

[73] Assignee: Nissan Motor Co., Ltd., Yokohama, Japan

[21] Appl. No.: 917,358

[22] Filed: Jul. 23, 1992

[30] Foreign Application Priority Data

Jul. 26, 1991 [JP] Japan .................................. 3-208850
Jul. 26, 1991 [JP] Japan .................................. 3-208860

[51] Int. Cl.⁵ .............................................. F16H 3/44
[52] U.S. Cl. ................................. 475/146; 192/85 AA
[58] Field of Search ............................... 475/146, 286; 192/85 AA, 48.8, 48.9, 48.91

[56] References Cited

U.S. PATENT DOCUMENTS

| | | | |
|---|---|---|---|
| 3,730,022 | 5/1973 | O'Mallen | 475/146 |
| 3,776,066 | 12/1973 | Piret | 475/146 X |
| 4,400,998 | 8/1983 | Bookout et al. | 475/146 X |
| 4,440,282 | 4/1984 | Ishimaru et al. | 192/85 AA X |
| 4,732,253 | 3/1988 | Hiramatsu et al. | 192/85 AA X |
| 4,753,132 | 6/1988 | Sumiya et al. | 475/146 |
| 4,836,052 | 6/1989 | Iwanaga et al. | 192/85 AA X |
| 4,935,872 | 6/1990 | Benford et al. | 364/424.1 |
| 4,994,006 | 2/1991 | Kinoshita et al. | 475/286 |
| 5,029,685 | 7/1991 | Takase et al. | 192/85 AA X |

FOREIGN PATENT DOCUMENTS 63-235728 9/1988 Japan .
1-80853 5/1989 Japan .

OTHER PUBLICATIONS

"Nisan Repair Manual, Nissan Automatic Transaxle RL4F03A Type", p. A-2, May 1989.
Nissan Repair Manual (L4N71B and E4N71B), 1982, p. 7.
Toyota Repair Manual (A340E), 1985.
Toyota Repair Manual (A540H).
Jaguar XJ6 Repair Manual (ZF4HP-22), p. 44-2.

Primary Examiner—Dirk Wright
Attorney, Agent, or Firm—Foley & Lardner

[57] ABSTRACT

A structure of an automatic transmission includes first and second clutches which are arranged radially so that one is surrounded by the other. This arrangement can reduce the size of the automatic transmission. For example, the first clutch has a first clutch drum splined to an input shaft of the transmission, a first clutch hub, and a first clutch pack between the first clutch drum and hub. The second clutch has a second clutch drum received in, and splined to, the first clutch drum, a second clutch hub, and a second clutch pack therebetween. The second clutch pack is surrounded by the first clutch pack. The second clutch further includes a piston which encloses the first clutch drum and which has a pushing portion on one side of the second clutch pack and a pressure receiving portion on the opposite side.

23 Claims, 6 Drawing Sheets

| SPEEDS | ENGAGING DEVICES | | | | |
|---|---|---|---|---|---|
| | $C_1$ | $C_2$ | $B_1$ | $B_2$ | $B_3$ |
| 1 | ○ | | | | ○ |
| 2 | ○ | | | ○ | |
| 3 | ○ | | ○ | | |
| 4 | ○ | ○ | | | |
| 5 | | ○ | ○ | | |
| R | | | ○ | | ○ |

STRUCTURE FOR AUTOMATIC TRANSMISSION

BACKGROUND OF THE INVENTION

The present invention relates to a structure of an automatic transmission.

U.S. Pat. No. 4,935,872 shows one conventional automatic transmission having two multiple disc clutches which are arranged axially so that one is placed ahead of the other along the axis. This arrangement increases the axial dimension of the automatic transmission.

SUMMARY OF THE INVENTION

It is an object of the present invention to provide a compact structure for an automatic transmission which can reduce the size and weight of the transmission.

According to the present invention, a structure comprises first, second and third rotating members, a first clutch means for making and breaking a driving connection between the first rotating member and the second rotating member, and a second clutch means for making and breaking a driving connection between the first rotating member and the third rotating member. The first and second clutch means are arranged not axially, but radially so that one is surrounded by the other.

In one preferred embodiment of the invention, the first clutch means is a first alternating clutch pack of clutch plates connected with the first rotating member and clutch plates connected with the second rotating member, and the second clutch means is a second alternating clutch pack of clutch plates connected with the first rotating member and clutch plates connected with the third rotating member. The first rotating member may comprise at least a first clutch drum, the second rotating member may comprise at least a first clutch hub, and the third rotating member may comprise a second clutch hub. The structure may further comprise a second clutch drum which is drivingly connected with the first clutch drum and which is surrounded by the first clutch hub. The first clutch pack is between the first clutch drum and hub. The second clutch pack is between the second clutch drum and hub. The structure may further comprise a first clutch piston for pushing the first clutch pack, and a second clutch piston comprising a pushing portion for pushing the second clutch pack and a cylindrical portion surrounding the the first clutch drum. The first and second clutch packs are placed axially between the first piston and the pushing portion of the second piston.

DETAILED DESCRIPTION OF THE INVENTION

Figure 1:
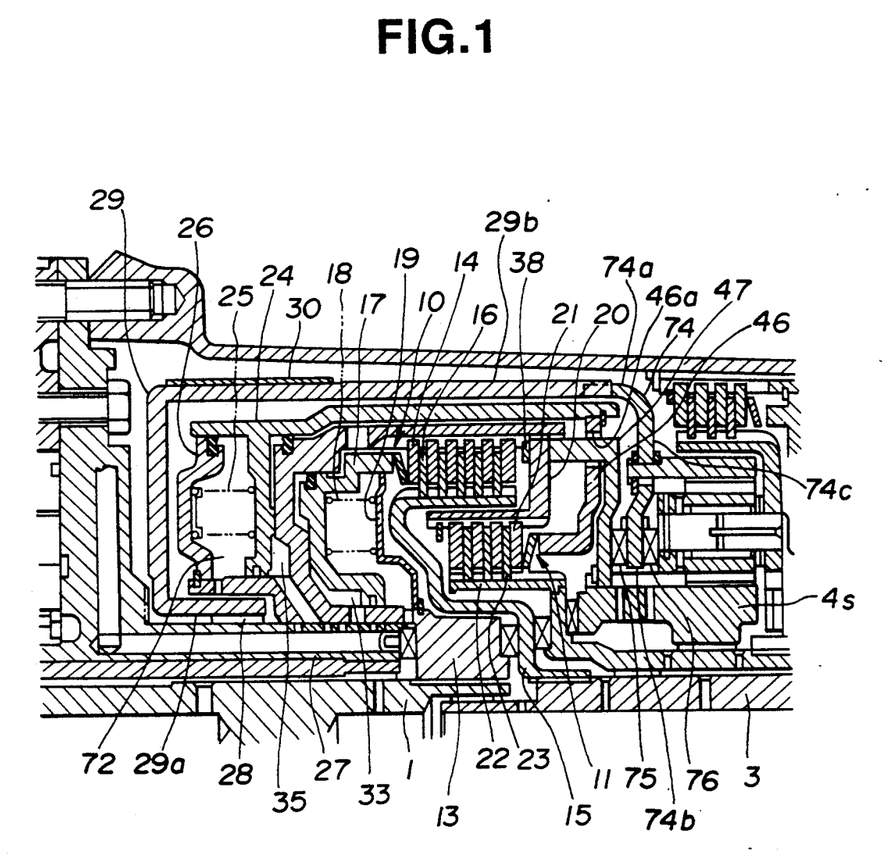
FIG. 1 is a sectional view showing a structure for an automatic transmission according to one embodiment of the present invention.

FIG. 1 shows a clutch structure according to one embodiment of the present invention, and FIGS. 2-5 show an automatic transmission including the clutch structure shown in FIG. 1.

Figure 2:
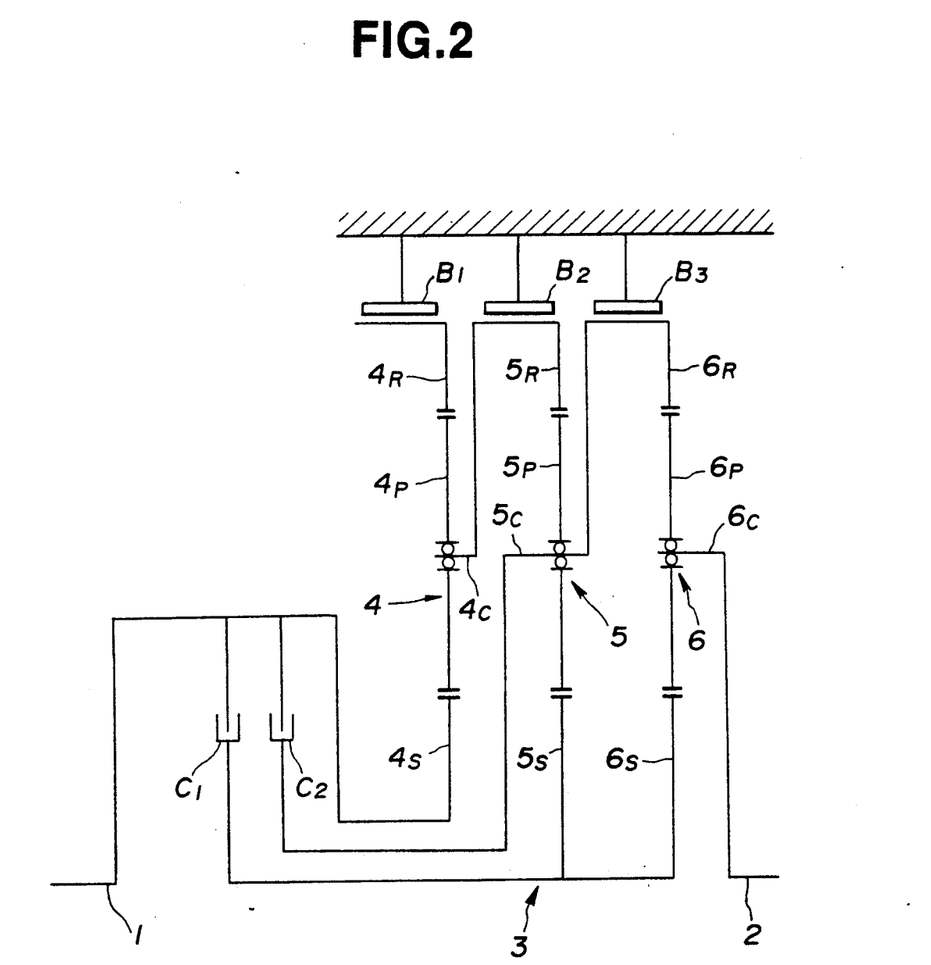
FIG. 2 is a skeleton diagram schematically showing the automatic transmission employed in this embodiment.

As shown in the skeleton diagram of FIG. 2, the automatic transmission includes an input member 1 in the form of a shaft, an output member 2 also in the form of a shaft, and an intermediate shaft 3. These shafts 1, 2 and 3 are arranged end to end in a straight line, and the intermediate shaft 3 is placed between the input and output shafts 1 and 2. The input shaft 1 has an inner end facing toward the output shaft 2, and an outer end which is more remote from the output shaft 2 than from the inner end. The output shaft 2 has an inner end facing toward the input shaft 1, and an outer end which is more remote from the input shaft 1 than from the input end of the output shaft 2. The intermediate shaft 3 has a first end confronting the inner end of the input shaft 1, and a second end confronting the inner end of the output shaft 2.

The automatic transmission further includes a planetary gear system which is arranged between the input and output shafts 1 and 2, and which is coaxial wiht the input, intermediate and output shafts 1, 3 and 2. In this embodiment, the planetary gear system includes a first planetary gear set 4, a second planetary gear set 5 and a third planetary gear set 6. The planetary gear system is connected between the input and output shafts 1 and 2, to transmit rotation therebetween.

The first planetary gear set 4 includes a first sun gear 4S, a first ring gear 4R, and a first planet carrier 4C rotatably carrying a set of first pinions 4P each of which is in direct engagement with both of the sun gear 4S and the ring gear 4R. Similarly, the second planetary gear set 5 includes a second sun gear 5S, a second ring gear 5R, and a second planet carrier 5C rotatably carrying second pinions 5P. The third planetary gear set 6 includes a third sun gear 6S, a third ring gear 6R and a third planet carrier 6C rotatably carrying third pinions 6P. In this embodiment, each of the first, second and third planetary gear sets 4, 5 and 6 is a simple planetary gear set of a single pinion type.

The automatic transmission shown in FIG. 2 further includes a selective engaging device group which, in this embodiment, consists of first and second clutches C1 and C2, and first, second and third brakes B1, B2 and B3.

The first sun gear 4S and the input shaft 1 are connected together so that they always rotate together. The second and third sun gears 5S and 6S are also connected together so as to prevent relative rotation therebetween. The input shaft 1 is connected with the second and third sun gears 5S and 6S through the first clutch C1. The second clutch C2 is connected between the second carrier 5C and the input shaft 1. The second clutch C2 can connect the second carrier 5C and the input shaft 1 together, and disconnect them one from the other. The second carrier 5C and the third ring gear 6R are connected together so that they rotate together. The first brake B1 is connected between the first ring gear 4R and a stationary member. The first brake B1 can hold the first ring gear 4R stationary. The second brake B2 can hold stationary the first carrier 4C and the second ring gear 5R which are connected together. The third brake B3 can hold stationary the second carrier 5C and the third ring gear 6R which are connected together. The third carrier 6C and the output shaft 2 are connected together.

Figure 4:
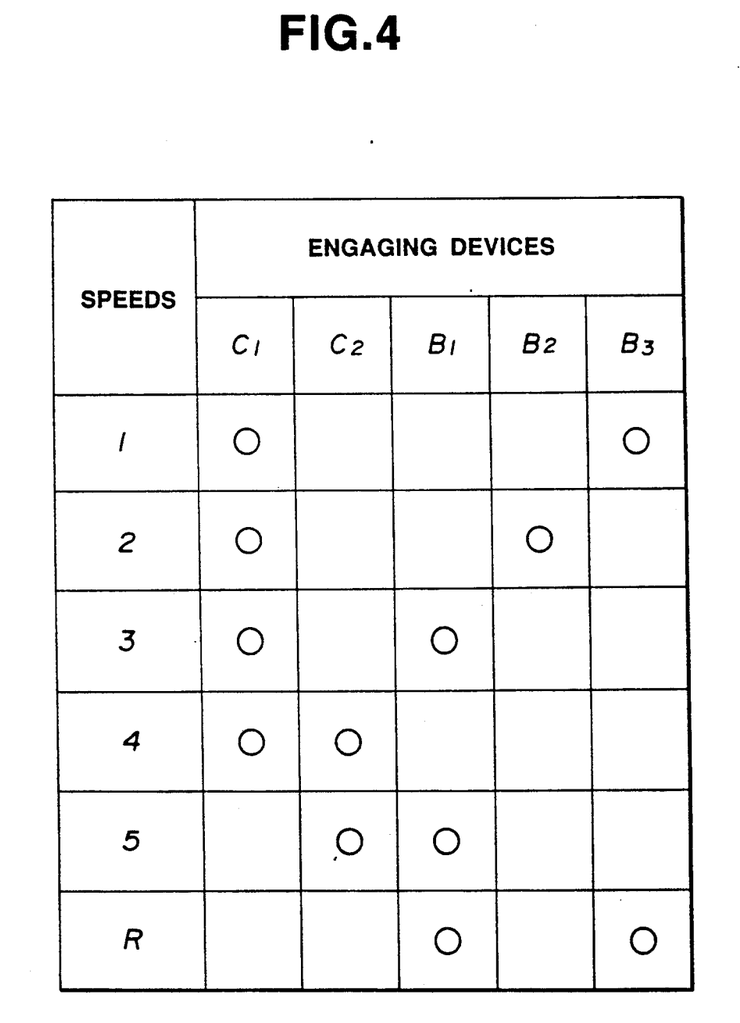
FIG. 4 is a table showing clutches and brakes to be engaged to obtain five forward speeds and one reverse speed with this automatic transmission.

The automatic transmission further includes a shift control system (or shift control means) which is connected with each of the selective engaging devices C1, C2, B1, B2 and B3, and arranged to provide first through fifth forward speeds and a reverse speed by engaging and disengaging the selective engaging devices as shown in a table of FIG. 4. In this table, engagement of any of the devices is shown by a small circle. This shift control system obtains each speed by engaging two of the five devices C1, C2, and B1-B3, and holding the remaining three disengaged. Each shift from one speed to the next speed is achieved by bringing one device from the engaged state to the disengaged state and another device from the disengaged state to the engaged state. During this, still another device is kept engaged. To effect an upshift from the first speed to the second speed, for example, the shift control system disengages the third brake B3 and instead engages the second brake B2. The first clutch C2 remains engaged, and needs not be operated.

Figure 3:
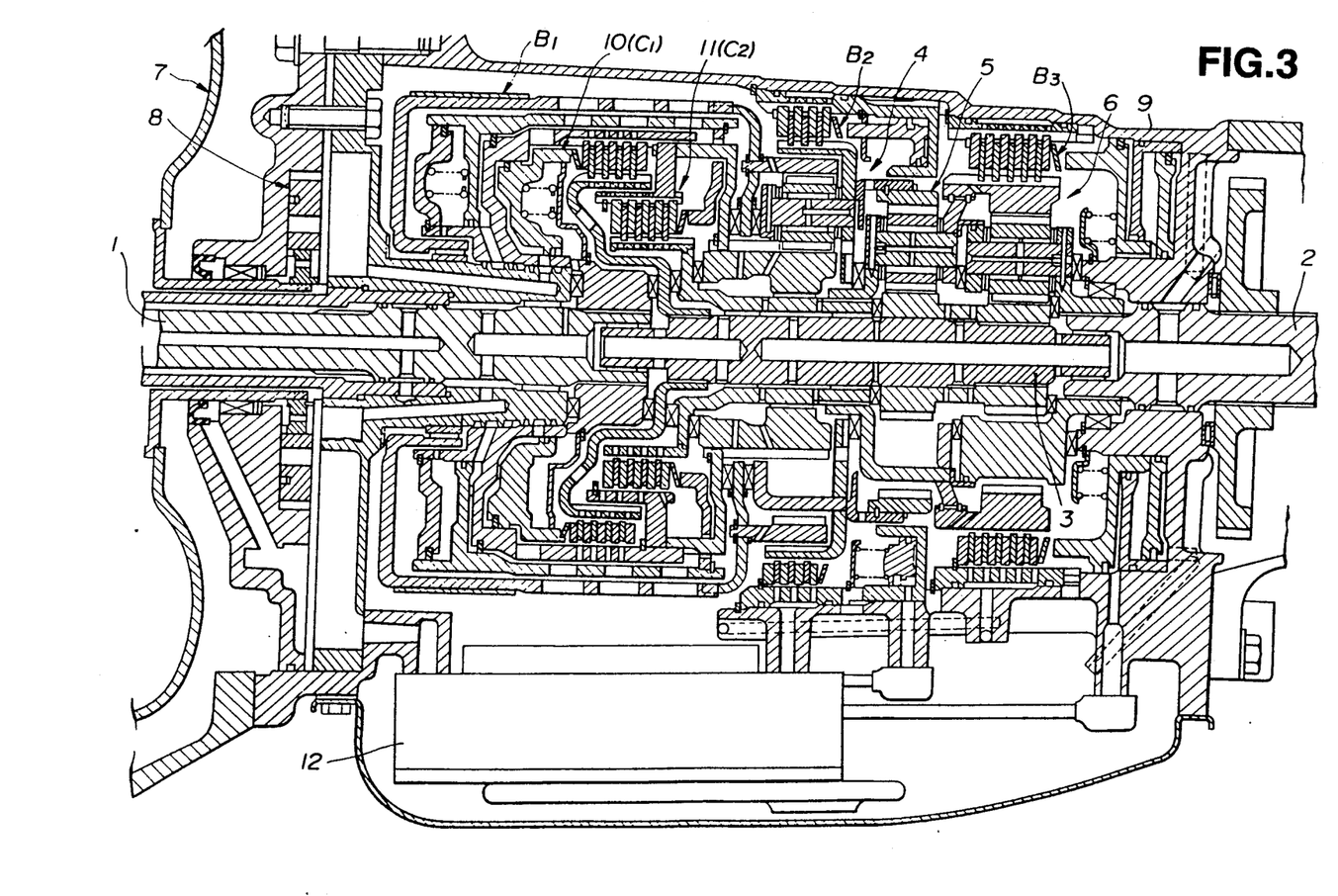
FIG. 3 is a sectional view showing the automatic transmission of this embodiment.

FIG. 3 shows the automatic transmission according to this embodiment of the present invention more concretely. As shown in FIG. 3, the axes of the input shaft 1, the intermediate shaft 3 and the output shaft 2 are all on a common straight line which is a center axis of the transmission. The input shaft 1 extends leftward as viewed in FIG. 3, into a torque converter 7 (FIG. 3 shows only a part of the torque converter 7). The automatic transmission shown in FIG. 2 is combined with the torque converter 7 to form a torque converter automatic transmission. An oil pump 8 is formed around a middle portion of the input shaft 1.

In the example shown in FIG. 3, each of the first and second clutches C1 and C2 are in the form of a multiple disc clutch 10 or 11. The first and second multiple disc clutches 10 and 11, and the first brake (band brake) B1 are all located around the input shaft 1 near the inner end (the right end as viewed in FIG. 3) of the input shaft 1.

The intermediate shaft 3 has the first (left) end which is rotatably supported by the inner (right) end of the input shaft 1, and the second (right) end which is rotatably supported by the inner (left) end of the output shaft 2. The first, second and third planetary gear sets 4, 5 and 6 are arranged around the intermediate shaft 3 between the first and second ends of the intermediate shaft 3. The second planetary gear set 5 is placed axially between the first and third planetary gear sets 4 and 6. The first planetary gear set 4 is axially between the first (left) end of the intermediate shaft 3 and the second planetary gear set 5. The third planetary gear set 6 is axially between the second planetary gear set 5 and the second (right) end of the intermediate shaft 3. The second and third brakes B2 and B3 are arranged around these planetary gear sets. The output shaft 2 extends rightward as viewed in FIG. 3. There are provided, around the output shaft 2, a piston of third brake B3 and a support wall.

This automatic transmission shown in FIG. 3 further includes a transmission case 9, and a control valve assembly 12 of the shift control system for supplying oil to each of oil passages shown in FIG. 3.

Figure 5:
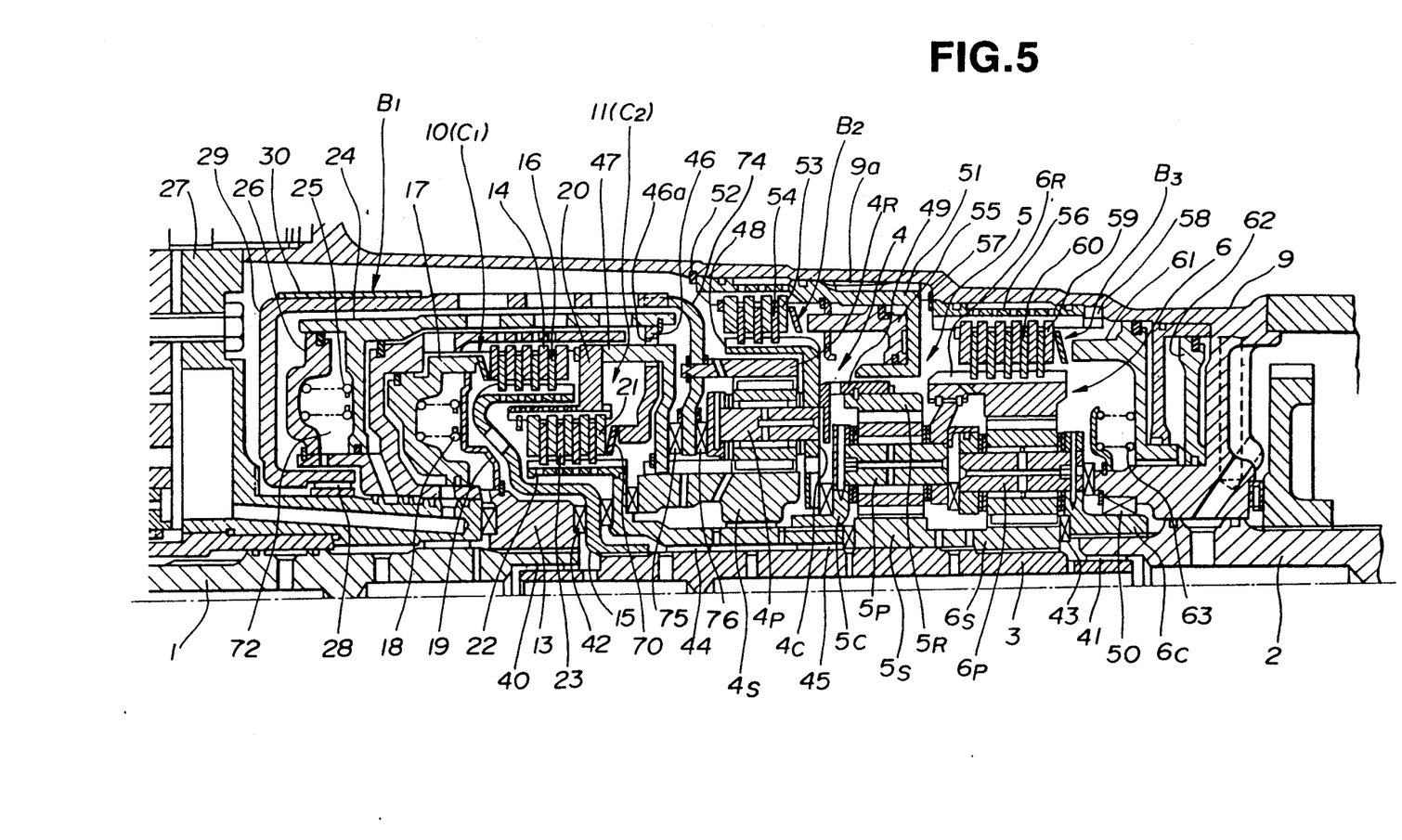
FIG. 5 is a sectional view showing the automatic transmission of FIG. 3 more in detail.

FIGS. 1 and 5 show the clutch structure of the automatic transmission of FIG. 3 in more detail.

The first multiple disc clutch 10 (C1) includes a first clutch drum (first rotating member) 13, and a first clutch pack (first clutch means) of first external and internal clutch plates 14 and 16 which are arranged alternately. The first clutch drum 13 is mounted on, and splined (coupled by means of one or more splines) to, the input shaft 1. The first external clutch plates 14 are engaged with the clutch drum 13. The first internal clutch plates 16 are engaged with a first clutch hub (second rotating member) 15 which is mounted on, and splined to, the intermediate shaft 3. The first clutch 10 (C1) further includes a first clutch piston 17 for pushing the alternating first clutch pack of the clutch plates in the right direction as viewed in FIG. 1 to engage the first clutch 10 by receiving an oil pressure, a spring 18 for urging the piston 17 in a release (left) direction, and a retainer 19 for supporting the spring 18. The first clutch piston 17 has a pushing portion for pushing the first clutch pack from the left side and a pressure receiving portion for receiving the clutch fluid pressure. The pushing portion, pressure receiving portion and the spring 18 of the first clutch 10 are all located on a first (left) side of the first clutch pack.

The second multiple disc clutch 11 (C2) includes a second clutch drum 20, and a second clutch pack (second clutch means) of second external and internal clutch plates 21 and 23. The second clutch drum 20 is received in, and splined to, the first clutch drum 13. The second external clutch plates 21 are engaged with the second clutch drum 20. The second internal clutch plates 23 are engaged with a second clutch hub (third rotating member) 22 which is coupled with the second carrier 5C by means of one or more splines. The second clutch 11 (C2) further includes a second clutch piston 24 for pushing the second clutch pack of the clutch plates 21 and 23 in the left direction to engage the second clutch 11 by receiving a fluid pressure, and a spring 25 for urging the second piston 24 in the release (right) direction.

In the clutch structure according to this embodiment of the invention, the first and second clutches 10 and 11 are arranged radially so that one is surrounded by the other. In the example shown in FIG. 1, the second clutch pack of the second clutch plates 21 and 22 is surrounded by the first clutch pack of the first clutch plates 14 and 16. The first and second clutch packs are placed axially between the pushing portion of the first piston 17 and a pushing portion of the second piston 24. Therefore, the axial dimension of this clutch structure is significantly reduced as compared with the conventional clutch structure in which the first and second clutches are arranged axially. The clutch structure shown in FIG. 1 can reduce the axial size and weight of the automatic transmission. The second clutch drum 20 is splined to the inside surface of the first clutch drum 13, so that this clutch structure can be readily assembled.

The second clutch 11 further includes an end member 26 which supports the spring 25 and defines a centrifugal fluid chamber 72 for producing a centrifugal oil pressure. The second piston 24 has the pushing portion for pushing the second clutch pack from a second (right) side, a cylindrical portion surrounding the first clutch drum 13, and a pressure receiving center portion receiving the clutch fluid pressure. The pushing portion of the second clutch piston 24 is located on the second (right) side of the second clutch pack, and the pressure receiving portion of the second clutch piston 24 is on the first (left) side of the second clutch pack.

The pressure receiving center portion of the second clutch piston 24 extends radially inwardly toward the input shaft 1 from the inside surface of the cylindrical portion, and divides the bore of the cylindrical portion of the second clutch piston 24 into a first (left) bore section and a second (right) bore section. The first clutch drum 13 is received in the second bore section. The end member 26 is fit in the first bore section to form the centrifugal fluid chamber 27 in the first bore section between the end member 26 and the pressure receiving portion of the second piston 24. Thus, the second clutch piston 24 has a T-shaped section as shown in FIG. 1. The spring 25 is disposed in the centrifugal fluid chamber 27.

The first brake (band brake) B1 includes a first brake drum 29 and a brake band 30. The first brake drum 29 has a hub portion 29a supported through a bearing 28 by a stationary support wall 27 for supporting the input shaft 1. The first brake drum 29 further has an outer cylindrical portion 29b which surrounds the second clutch piston 24. The brake band 30 is wrapped around the outer cylindrical portion 29b of the first brake drum 29.

In this way, the first and second clutches 10 (C1) and 11 (C2) and the first brake B1 are compactly arranged on the input shaft 1, so that a sufficient space is left for placing the first, second and third planetary gear sets 4, 5 and 6 around the intermediate shaft 3. Three of the five engaging devices C1, C2 and B1-B3 are located around the input shaft 1, and only the remaining two are arranged around the intermediate shaft 3.

The first clutch drum 13 separates a first clutch fluid pressure chamber 33 formed between the first clutch piston 17 and the first clutch drum 13, from a second clutch fluid pressure chamber 35 formed between the second clutch piston 24 and the first clutch drum 13. Both chambers 33 and 35 are located on the first (left) side of the first and second clutch packs. When an oil pressure is supplied to the first chamber 33, then the first piston 17 moves rectilinearly in a first (rightward) direction and compresses the first clutch pack of the first clutch plates 14 and 16. Therefore, the first clutch 10 transmits an input rotation of the input shaft 1 from the first clutch drum 13 to the first clutch hub 15, which drives the intermediate shaft 3 at an input speed of the input shaft 1. When an oil pressure is supplied to the second pressure chamber 35, the second clutch piston 24 moves in a second (leftward) direction, and compresses the second clutch pack of the second clutch plates 21 and 23. In this case, the input rotation of the input shaft 1 transmitted to the second clutch drum 20 through the first clutch drum 13 is further transmitted to the second clutch hub 22, which drives the second carrier 5C at the input speed.

When the oil pressure is supplied to the second clutch fluid pressure chamber 35 and the second second piston 24 pushes the second clutch pack, the right end of the second piston 24 receives a reaction force which tends to deform the right end of the second piston 24 radially outwardly. This outward force acts as a bending moment, and the left end of the second piston 24 receives a force acting radially inwardly toward the center axis of the transmission. However, the end member 26 and the centrifugal oil pressure in the chamber 72 receive this inward force, and prevent the left end of the second piston 24 from being deformed inwardly. Therefore, it is possible to reduce the wall thickness of the second clutch piston 24. This clutch structure can reduce the size and weight of the automatic transmission.

Figure 6A:
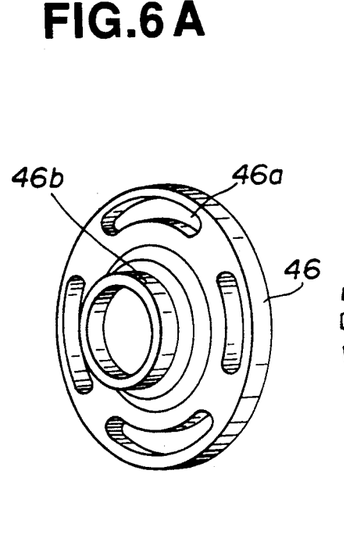
FIGS. 6A and 6B are perspective views showing a pushing member 46 and a first connecting member 47 used in the structure shown in FIG. 1.

The second clutch piston 24 of this embodiment consists of a main member having the pressure receiving portion and the cylindrical portion surrounding the first clutch drum, and a pushing member 46 serving as the pushing portion for pushing the second clutch pack. As shown in FIG. 6A, the pushing member 46 has a circular disc portion formed with four arched holes 46a, and a central portion 46b projecting axially from the circular disc portion. The holes 46a are shaped like a circular arc and arranged in a circle around the central portion 46b in the manner of radial symmetry. The central portion 46b projects toward the second clutch pack, and abuts on a dish plate 70 as shown in FIG. 5. The dish plate 70 is disposed between the second clutch pack and the central portion 46b of the pushing member 46.

Figure 6B:
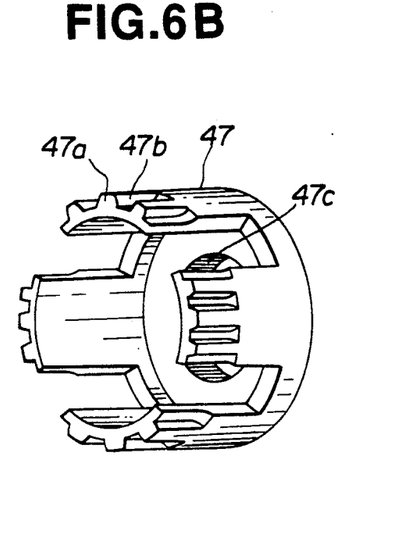

The clutch structure shown in FIG. 1 further includes a first connecting member 47 which connects the first clutch drum 13 with the first sun gear 4S, so that the first sun gear 4S rotates always at the input speed of the input shaft 1. The second clutch drum 20 is disposed axially between the first connecting member 47 serving as a positioning member, and a snap ring 38, so that the second clutch drum 20 is prevented from falling. As shown in FIG. 6B, the first connecting member 47 has four arched arms 47a formed with splines 47b and a circular disk portion formed with a center hole 47c. The arms 47a projects axially from the outer periphery of the circular disk portion. The arms 47a is arranged in a circle so as to form a radially symmetric figure. Each arm 47a has an inside cylindrical surface and an outside surface formed with the splines 47b extending axially. In the assembled state shown in FIG. 1, each of the four arms 47 is inserted through a unique one of the four arched holes 46a of the pushing member 46, and the splines 47b are engaged with splines formed in the inside surface of the first clutch drum 13. The first sun gear 4S has a hub portion which is inserted and fixed in the center hole 47c of the first connecting member 47. The pushing member 46 is interposed axially between the first clutch drum 13 on the first (left) side, and the first sun gear 4S on the second (right) side. The arms 47a extends axially from the second side toward the first clutch drum 13 through the arched holes 46a. In this way, the input rotation of the input shaft 1 is transmitted through the first clutch drum 13 and the first connecting member 47 to the first sun gear 4S, and at the same time transmitted to the second piston 24 through the arched holes 46a of the pushing member 46.

Figure 7:
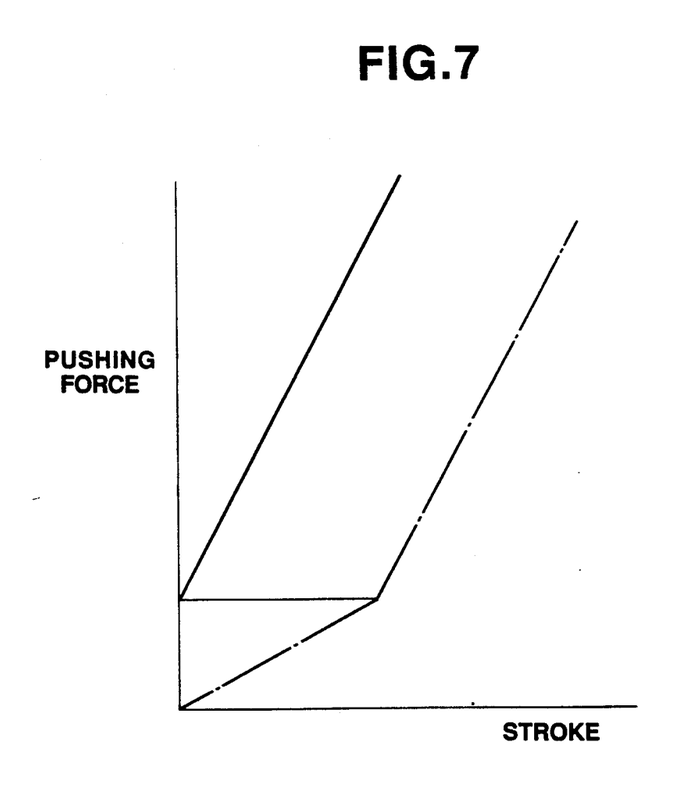
FIG. 7 is a graph showing a characteristic of a clutch 11(C2) employing the pushing member 46 shown in FIG. 6A.

In this design, it is possible to adjust the rigidity of the pushing member 46 by modifying the shape and size of the holes 46a. Therefore, this clutch structure can provide a clutch characteristic (clutch feeling) shown by a one dot chain line in FIG. 7, by adjusting the rigidity of the pushing member 46 properly, without increasing the axial length of the automatic transmission and without reducing the stroke of the clutch. If the pushing member 46 were not formed with the holes 46a, then the second clutch 11 would provide a characteristic determined solely by the single dish plate (belleville spring or disk spring) 70 as shown by a solid line in FIG. 7. The pushing member 46 with the arched holes 46a can provide the clutch characteristic equivalent to that of a two stage spring arrangement having two different dish plates. According to the clutch characteristic shown by the one dot chain line in FIG. 7, the clutch can provide a larger stroke with a small pushing force at an initial stage of the stroke, and provides a small stroke with a large pushing force when the clutch has been engaged. Therefore, this clutch structure can improve the clutch capacity, and provide an optimum clutch characteristic. Furthermore, the arrangement of the members 46 and 47 facilitates the assembly process of the structure.

The structure shown in FIG. 1 further includes a second connecting member 74 for connecting the first brake drum 29 with the first ring gear 4R. The second connecting member 74 has an outer portion 74a, an inner portion 74b, and a middle portion (holding portion) 74c. The second connecting member 74 extends radially inwardly from the outer portion 74a to the inner portion 74b. The inner portion 74b is closer to the center axis of the transmission than the outer portion 74a. The middle portion 74c is between the inner and outer portions 74a and 74b. The middle portion 74c is closer to the center axis than the outer portion 74a, but remote from the center axis than the inner portion 74b. The outer portion 74a has dents which are interdigitated with dents formed in the (right) end of the outer cylindrical portion 29b of the first clutch drum 29. Therefore, rotation is transmitted between the first brake drum 29 and the second connecting member 74, but no radial force acting in a direction perpendicular to the center axis of the transmission (the up-and-down direction as viewed in FIG. 1) is transmitted. The middle portion 74c is connected with the first ring gear 4R so as to prevent relative rotation between the second connecting member 74 and the first ring gear 4R. In this example, projections of the ring gears 4R are inserted, respectively, in holes of the second connecting member 74, and fixed by snap rings 37-39. The inner portion 74b is supported between first and second bearings 75 and 76 which are spaced axially. In this example, each of the bearings 75 and 76 is a thrust needle bearing. The first thrust bearing 75 on the left side in FIG. 1 is disposed between the first connecting member 47 and the second connecting member 74. The second thrust bearing 76 on the right side is disposed between the second connecting member 74 and the first planet carrier 4C. The first and second thrust bearings 75 and 76 are supported, respectively, by the first connecting member 47 and the first planet carrier 4C. The first and second thrust bearings 75 and 76 are located at a radial position closer to the center axis than the radial position of the first ring gear 4R. When the first brake B1 is applied, the brake band 30 prevents rotation of the first brake drum 29, and thereby holds stationary the first ring gear 4R which is connected with the first brake drum 29 so as to prevent relative rotation therebetween by the second connecting member 74.

This structure makes it possible to reduce the diameter of the first and second thrust bearings 75 and 76, and thereby to reduce the rotational speed (peripheral speed) of the bearings 75 and 76. Therefore, it is possible to reduce the size of the automatic transmission by employing the bearings 75 and 76 of smaller capacity and size, and to improve the durability of the bearings 75 and 76. The second connecting member 74 is not rigidly connected with the first brake drum 29. Therefore, a force produced by an eccentric movement of the first clutch drum 29 due to constriction of the brake band 30 is not transmitted from the first brake drum 29 to the second connecting member 74. The first and second thrust bearings 75 and 76 and the first ring gear 4R are all exempt from the undesired force of the first brake drum 29. In one conventional automatic transmission {cf. Nissan *Seibi Youryosho* (Service Manual) "Nissan OD automatic transmission, L4N71B type and E4N71B type" published by Nissan Motor Co., LTD, 1982}, a ring gear is supported between two thrust bearings. In this structure, the two thrust bearings are placed at the radial position of the ring gear.

First and second bearing 40 and 41 are provided on both ends of the intermediate shaft 3, as shown in FIG. 5. The first bearing 40 is interposed between the first (left) end of the intermediate shaft 3 and the inner (right) end of the input shaft 1. The first end of the intermediate shaft 3 is supported by the inner end of the input shaft 1 through the first bearing 40. Similarly, the second end of the intermediate shaft 3 is supported by the inner end of the output shaft 21 through the second bearing 41.

As shown in FIGS. 1 and 5, the first clutch hub 15 has an inner end which is mounted on, and splined to, the intermediate shaft 3 near the first end of the intermediate shaft 3. A first (left) portion of the intermediate shaft 3 near the first end is supported by the first clutch hub member 15, and further through a bearing 42 by the first clutch drum 13 on the input shaft 1. A second (right) portion of the intermediate shaft 3 near the second end is supported by the third sun gear 6S, and through a bearing 43 by the third carrier 6C on the output shaft 2. The second clutch hub member 22 is coupled with the second carrier 5C by means of one or more splines. The second clutch hub member 22 is rotatably mounted on the intermediate shaft 3 through bearings 44 and 45. The third sun gear 6S is mounted on, and coupled with the intermediate shaft 3 by means of one or more splines. The second and third sun gears 5S and 6S are connected together to form a single rotary member. Therefore, the second and third sun gears 5S and 6S rotate together with the intermediate shaft 3.

The second brake B2 includes a brake hub 48 which is connected with the first carrier 4C, which is further connected with the second ring gear 5R by a connecting member 49. The second planet carrier 5C has a left end splined to the second clutch hub member 22, and a right end connected with the third ring gear 6R. The ring gear 6R has a portion serving as a brake hub of the third brake B3. The third planet carrier 6C is mounted on, and splined to, the output shaft 2, which is in turn supported on the transmission case 9 through a bearing 50.

The second brake B2 includes a brake drum 51 which is fit in the transmission case 9 and which surrounds the first and second planetary gear sets 4 and 5. The brake drum 51 is fixed to the transmission case 9 by a snap ring 52 and teeth 9a formed on the inside surface of the transmission case 9. The second brake B2 further includes an alternating pack of external brake plates 53 engaged with the brake drum 51, and internal brake plates 54 engaged with the brake hub 48. The second brake B2 further includes a brake piston 55 which is slidably received in the brake drum 51. The second brake B2 is applied when the brake piston 55 moves leftwards as viewed in FIG. 1 against the force of a return spring (not shown) by the action of a fluid pressure.

The third brake B3 includes a brake drum 56, and an alternating pack of external brake plates 59 engaged with the brake drum 56 and internal brake plates 60 engaged with the third ring gear 6R serving as a brake hub. The brake drum 56 surrounds the third planetary gear set 6, and is fit in the transmission case 9. The brake drum 56 is fixed to the transmission case 9 by a snap ring 57 and a member 58 for preventing rotation. The third brake B3 further includes a double piston structure including pistons 61 and 62. The pistons 61 and 62 are separated from the brake drum 56, and slidably received in a piston chamber formed in the transmission case 9, around the left end portion of the output shaft 2. The pistons 61 and 62 move leftwards in FIG. 1 by the action of a fluid pressure against the force of a spring 63 when the third brake B3 is applied.

In the automatic transmission of this embodiment, each of the second and third sun gears 5S and 6S can be regarded as a first operating member (or first driven member) which is connected with the first clutch hub 15 (corresponding to the second rotating member). The second planet carrier 5C can be regarded as a second operating member (or second driven member) which is connected with the second clutch hub 22 (corresponding to the third rotating member). The first sun gear 4S can be regarded as a third operating member (or third driven member) which is connected with the first connecting member 47. The first ring gear 4R can be regarded as a fourth operating member which is connected with the first clutch drum 29 by the second connecting member 74. In this example, the second rotating member may comprise the first clutch hub 15 and the intermediate shaft 3.

What is claimed is:

1. A structure for an automatic transmission, comprising:
   first, second and third rotating members;
   a first clutch means for drivingly connecting said second member with said first member and disconnecting said second member from said first member; and
   a second clutch means for drivingly connecting said third member with said first member and disconnecting said third member from said first member, said first and second clutch means being arranged radially so that said second clutch means is surrounded by said first clutch means,
   wherein, said second and third rotating members are surrounded by said first rotating member, and said second rotating member comprises an inner portion which is surrounded by said third rotating member.

2. A structure according to claim 1 wherein said first clutch means comprises a first clutch pack of first external clutch plates and first internal clutch plates which are arranged alternately, said second clutch means comprises a second clutch pack of second external clutch plates and second internal clutch plates which are arranged alternately, and said first clutch pack surrounds said second clutch pack.

3. A structure according to claim 1, wherein said first clutch means comprises a first clutch pack of first external clutch plates and first internal clutch plates which are arranged alternately, said second clutch means comprises a second clutch pack of second external clutch plates and second internal clutch plates which are arranged alternately, and said first clutch pack is surrounded by said second clutch pack, wherein said first rotating member comprises first and second clutch drums which rotate as a unit, said first clutch drum comprises an outer cylindrical portion engaged with said first external clutch plates, said second clutch drum comprises a cylindrical portion engaged with said second external clutch plates, said second rotating member comprises a first clutch hub comprising an outer cylindrical portion engaged with said first internal clutch plates, and said third rotating member comprises a second clutch hub comprising a cylindrical portion engaged with said second internal clutch plates, and wherein said first clutch drum comprises a radial portion extending radially inwardly from said outer cylindrical portion of said first clutch drum, said second clutch drum comprises a radial portion extending radially outwardly from said cylindrical portion of said second clutch drum to said outer cylindrical portion of said first clutch drum, said first clutch hub comprises a radial portion extending radially and connecting said outer and inner cylindrical portions of said second rotating member, said first clutch pack is placed axially between said radial portions of said first and second clutch drums, and said radial portion of said first clutch hub is placed axially between said radial portion of said first clutch drum and said second clutch pack.

4. A structure for an automatic transmission, comprising:
   first, second and third rotating members;
   a first clutch means for drivingly connecting said second member with said first member and disconnecting said second member from said first member; and
   a second clutch means for drivingly connecting said third member with said first member and disconnecting said third member from said first member, said first and second clutch means being arranged radially so that one is surrounded by the other;
   wherein said first clutch means comprises a first clutch pack of first external clutch plates and first internal clutch plates which are arranged alternately, said second clutch means comprises a second clutch pack of second external clutch plates and second internal clutch plates which are arranged alternately, and said first clutch pack is surrounded by said second clutch pack;
   wherein said first rotating member comprises a first clutch drum which is engage with said first external clutch plates, said second rotating member comprises a first clutch hub which is engaged with said first internal clutch plates, and said third rotating member comprises a second clutch hub which is engaged with said second internal clutch plates, and said structure further comprises a second clutch drum which drivingly connects said first rotating member with said second external clutch plates, and which is surrounded by said first clutch hub of said second rotating member, and wherein said structure further comprises a first clutch piston which is surrounded by said first rotating member and which comprises a pushing portion for pushing said first clutch pack, and a second clutch piston comprising a pushing portion for pushing said second clutch pack, and a cylindrical portion surrounding said first clutch drum, said first and second clutch packs being placed between said first piston and said pushing portion of said second clutch piston.

5. A structure according to claim 4 wherein said first clutch piston comprises a pressure receiving portion defining a first clutch fluid pressure chamber formed between said first clutch piston and said first clutch drum, and said second clutch piston comprises a pressure receiving portion defining a second clutch fluid pressure chamber formed between said second clutch piston and said first clutch drum, said pressure receiving portion and said pushing portion of said first clutch piston and said pressure receiving portion of said second piston being all located on a first side of said first and second clutch packs, and said pushing portion of said second piston being located on a second side of said first and second clutch packs, said first and second sides being opposite sides of said first and second clutch packs.

6. A structure according to claim 5 wherein said pushing portion of said second clutch piston is formed with a plurality of holes, and said structure further comprising a first connecting member comprising a plurality of arms each of which extends axially and passes through one of said holes, and each of which has an end connected with said first clutch drum.

7. A structure according to claim 5 wherein said pressure receiving portion of said second clutch piston projects radially inwardly from an inside surface of said cylindrical portion of said second clutch piston, and divides a bore of said cylindrical portion of said second clutch piston into a first bore section and a second bore section, said first and second clutch packs being placed in said second bore section, said structure further comprising an end member fit in said first bore section so that a centrifugal fluid chamber is formed in said first bore section between said end member and said pressure receiving portion of said second clutch piston.

8. A structure according to claim 6 wherein said structure further comprises a first brake comprising a first brake drum surrounding said second clutch piston and a brake band wrapped around said first brake drum.

9. A structure according to claim 8 wherein said structure further comprises a planetary gear system comprising first, second, third and fourth operating members each of which is one of sun gears, planet carriers and ring gears constituting said planetary gear system, said second rotating member is connected with said first operating member, said third rotating member is connected with said second operating member, said first connecting member is connected with said third operating member, and said structure further comprising a second connecting member connecting said first brake drum with said fourth operating member, said second connecting member comprising a holding portion connected with said fourth operating member and an inner portion which extends radially inwardly from said holding portion and which is supported between first and second bearings.

10. A structure according to claim 9 wherein said structure further comprises an input shaft which is connected with said first rotating member; said second rotating member comprises an intermediate shaft which is aligned with said input shaft; said third rotating member comprises a hollow shaft portion which is rotatably mounted on said intermediate shaft; said planetary gear system comprises a first planetary gear set comprising a first sun gear rotatably mounted on sad hollow shaft portion of said third rotating member, a first ring gear and a first planet carrier; said third operating member is said first sun gear; said fourth operating member is said first ring gear; said first bearing is a first thrust bearing disposed between said first connecting member and said inner portion of said second connecting member; and said second bearing is a second thrust bearing disposed between said first planet carrier and said inner portion of said second connecting member.

11. A structure according to claim 10 wherein said planetary gear system further comprises a second planetary gear set comprising a second sun gear, a second ring gear connected with said first planet carrier, and a second planet carrier, and a third planetary gear set comprising a third sun gear connected with said second sun gear, a third ring gear connected with said second planet carrier, and a third planet carrier, and said structure further comprises an output shaft connected with said third planet carrier, a second brake for holding said first planet carrier and said second ring gear, and a third brake for holding said second planet carrier and said third ring gear, said second rotating member being connected with said second and third sun gear, and said third rotating member being connected with said second planet carrier.

12. A structure according to claim 4 wherein said structure further comprises:
input and output shafts which are arranged in a line;
a planetary gear system comprising a first planetary gear set comprising a first sun gear connected with said input shaft, a second planetary gear set and a third planetary gear set comprising a third planet carrier connected with said output shaft, said second planetary gear set being placed between said first and third planetary gear sets, said first planetary gear set further comprising a first planet carrier and a first ring gear, a second planet gear set comprising a second sun gear, a second planet carrier and a second ring gear connected with said first planet carrier, and said third planetary gear set further comprising a third sun gear connected with said second sun gear and a third ring gear connected with said second carrier, said input shaft being connected with said second and third sun gears through said first clutch means, said input shaft being further connected with said second planet carrier through said second clutch means; and
a brake group comprising a first brake for holding said first ring gear, a second brake for holding said first planet carrier and said second ring gear, and a third brake for holding said second planet carrier and said third ring gear;
wherein said input shaft is connected with said second and third sun gears through said first clutch pack, and said input shaft is further connected with said second planet carrier through said second clutch pack.

13. A structure of an automatic transmission, comprising:
a first clutch comprising a first clutch drum;
a second clutch comprising a second clutch piston which surrounds said first clutch drum and which comprises a hole; and
a first connecting member comprising an arm which extends axially and passes through said hole.

14. A structure according to claim 13 wherein said structure further comprises an input shaft connected with said first clutch drum; a first driven member which is connected with said input shaft through said first clutch, a second driven member which is connected with said input shaft through said second clutch, and a third driven member which is connected with said first clutch drum by said first connecting member.

15. A structure according to claim 14, further comprising
an output shaft which is arranged in a line with said input shaft;
a planetary gear system comprising a first planetary gear set comprising a first sun gear connected with said input shaft, a second planetary gear set and a third planetary gear set comprising a third planet carrier connected with said output shaft, said second planetary gear set being placed between said first and third planetary gear sets, said first planetary gear set further comprising a first planet carrier and a first ring gear, a second planet gear set comprising a second sun gear, a second planet carrier and a second ring gear connected with said first planet carrier, and said third planetary gear set further comprising a third sun gear connected with said second sun gear and a third ring gear connected with said second carrier, said input shaft being connected with said second and third sun gears through said first clutch, said input shaft being further connected with said second planet carrier through said second clutch; and
a brake group comprising a first brake for holding said first ring gear, a second brake for holding said first planet carrier and said second ring gear, and a third brake for holding said second planet carrier and said third ring gear;
wherein said first driven member comprises said second and third sun gears which are connected together, said second driven member comprises said second planet carrier, and said third driven member comprises said first sun gear.

16. A structure of an automatic transmission, comprising:
a planetary gear system comprising a first operating member which functions as one of a sun gear, a ring gear and a planet carrier;
a connecting member comprising a holding portion connected with said first operating member, and an inner portion extending radially inwardly from said holding portion; and
a pair of first and second bearings for rotatably supporting said inner portion of said connecting member, said inner portion being placed axially between said first and second bearings.

17. A structure according to claim 16, further comprising
input and output shafts which are arranged in a line;
a planetary gear system comprise a first planetary gear set comprising a first sun gear connected with said input shaft, a second planetary gear set and a third planetary gear set comprising a third planet carrier connected with said output shaft, said second planetary gear set being placed between said first and third planetary gear sets, said first planetary gear set further comprising a first planet carrier and a first ring gear, a second planet gear set comprising a second sun gear, a second planet carrier and a second ring gear connected with said first planet carrier, and said third planetary gear set further comprising a third sun gear connected with said second sun gear and a third ring gear connected with said second carrier, said input shaft being connected with said second and third sun gears through said first clutch, said input shaft being further connected with said second planet carrier through said second clutch; and
a brake group comprising a first brake for holding said first ring gear, a second brake for holding said first planet carrier and said second ring gear, and a third brake for holding said second planet carrier and said third ring gear;
wherein said input shaft is connected with said second and third sun gears through said first clutch, said input shaft is further connected with said second planet carrier through said second clutch, said operating member comprises said first ring gear, and said first brake comprises a brake drum which is connected with said first ring gear by said connecting member.

18. A structure for an automatic transmission, comprising:
a clutch drum;
a pack of clutch plates disposed in said clutch drum;
a clutch piston comprising a cylindrical portion surrounding said clutch drum, and a center portion which projects radially inwardly from an inside surface of said cylindrical portion and which divides a bore of said cylindrical portion into a first bore section and a second bore section, said clutch drum being placed in said second bore section; and
an end member which is fit in said first bore section and which forms a centrifugal fluid chamber between said end member and said center portion of said piston for producing a centrifugal oil pressure.

19. A structure according to claim 18, further comprising
input and output shafts which are arranged in a line;
a planetary gear system comprising a first planetary gear set comprising a first sun gear connected with said input shaft, a second planetary gear set and a third planetary gear set comprising a third planet carrier connected with said output shaft, said second planetary gear set being placed between said first and third planetary gear sets, said first planetary gear set further comprising a first planet carrier and a first ring gear, a second planet gear set comprising a second sun gear, a second planet carrier and a second ring gear connected with said first planet carrier, and said third planetary gear set further comprising a third sun gear connected with said second sun gear and a third ring gear connected with said second carrier, said input shaft being connected with said second and third sun gears through said first clutch means, said input shaft being further connected with said second planet carrier through said second clutch means; and
a brake group comprising a first brake for holding said first ring gear, a second brake for holding said first planet carrier and said second ring gear, and a third brake for holding said second planet carrier and said third ring gear;
wherein said input shaft is connected with said second and third sun gears through said first clutch, said input shaft is further connected with said second planet carrier through said second clutch, and said second clutch comprises said clutch drum said pack of said clutch plates and said clutch piston.

20. An automatic transmission comprising:
input and output member;
a planetary gear system connected between said input member and said output member, said planetary gear system comprising first and second operating members each of which is one of sun gear, ring gear and planet carrier;
a first clutch comprising a first clutch drum connected with said input member, a first clutch hub connected with said first operating member, and a first alternating clutch pack of first external clutch plates engaged with said first clutch drum and first internal clutch plates engaged with said first clutch hub, and a first piston for compressing said first clutch plate pack; and
a second clutch comprising a second clutch drum connected with said input member, a second clutch hub connected with said second operating member, a second alternating clutch pack of second external clutch plates engaged with said second clutch drum and second internal clutch plates engaged with said second clutch hub, and a second clutch piston for compressing said second clutch plate pack, said second clutch pack being surrounded by said first clutch plate pack;
wherein said second clutch piston comprises a pressure receiving portion for receiving a fluid pressure to apply said second clutch, and a pushing portion for pushing said second clutch pack, said second clutch pack being located axially between said pressure receiving portion and said pushing portion of said second clutch piston.

21. An automatic transmission according to claim 20 wherein said first piston comprising a pressure receiving portion for receiving a fluid pressure to apply said first clutch and a pushing portion for pushing said first clutch pack, said pressure receiving portion and said pushing portion of said first clutch piston being both located on one side of said first clutch pack, said first and second clutch packs are placed axially between said first piston and said pushing portion of said second clutch piston.

22. An automatic transmission according to claim 21 wherein said first piston is received in said first clutch drum so that a first fluid pressure chamber is formed between said first piston and said first clutch drum, and said second piston comprises a cylindrical portion which connects said pressure receiving portion and said pushing portion of said second piston, said first clutch drum being received in said cylindrical portion of said second clutch piston so that a second fluid pressure chamber is formed between said second clutch piston and said first clutch drum.

23. An automatic transmission according to claim 22 wherein said second clutch drum comprises an outward portion which is connected with said first clutch drum and which is placed axially between said first clutch pack and said pushing portion of said second clutch piston.

* * * * *